US009736651B2

United States Patent
Chen et al.

(10) Patent No.: US 9,736,651 B2
(45) Date of Patent: Aug. 15, 2017

(54) METHOD AND SYSTEM FOR PROVIDING DASH OPTIMIZATION FOR MOBILE DEVICES

(71) Applicant: Verizon Patent and Licensing, Inc., Basking Ridge, NJ (US)

(72) Inventors: Ming Chen, Bedford, MA (US); Lei Zhang, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 391 days.

(21) Appl. No.: 14/051,254

(22) Filed: Oct. 10, 2013

(65) Prior Publication Data

US 2015/0106312 A1    Apr. 16, 2015

(51) Int. Cl.
*H04L 12/28*   (2006.01)
*H04W 4/02*    (2009.01)
*H04W 4/18*    (2009.01)
*H04W 80/06*   (2009.01)

(52) U.S. Cl.
CPC ............ *H04W 4/028* (2013.01); *H04W 4/18* (2013.01); *H04W 80/06* (2013.01)

(58) Field of Classification Search
CPC ....... H04W 4/02; H04W 4/028; H04W 24/02; H04W 28/22; H04W 48/04; H04W 72/085; H04W 72/1252; H04W 28/18; H04W 72/02; H04W 72/082; H04W 64/00; H04W 4/022; H04W 4/027; H04W 64/006; H04W 52/223; H04W 52/228; H04W 4/18; H04W 80/06; G06F 17/30867; G06N 5/02; H04L 67/32; G06Q 30/0255; G06Q 30/0261; G06Q 30/0267

USPC ...... 370/252; 709/232, 224, 231; 455/452.1, 455/456.1, 457; 706/46
See application file for complete search history.

(56) References Cited

U.S. PATENT DOCUMENTS

| | | | |
|---|---|---|---|
| 8,495,237 B1* | 7/2013 | Bilinski | H04L 65/1083 709/224 |
| 2010/0121977 A1* | 5/2010 | Kontola | H04L 1/0002 709/232 |
| 2010/0131443 A1* | 5/2010 | Agarwal | G06F 17/30867 706/46 |
| 2011/0093605 A1* | 4/2011 | Choudhury | H04L 65/4084 709/231 |
| 2012/0009890 A1* | 1/2012 | Curcio | H04L 29/06 455/230 |
| 2014/0200038 A1* | 7/2014 | Rao | H04L 67/2847 455/457 |
| 2015/0038156 A1* | 2/2015 | Kilpatrick, II | H04W 64/00 455/452.1 |
| 2016/0192243 A1* | 6/2016 | Egner | H04W 4/028 455/456.1 |

\* cited by examiner

*Primary Examiner* — Wei Zhao
*Assistant Examiner* — Lionel Preval

(57) ABSTRACT

An approach is provided for location-based TCP throughput predictions and carrier-assisted video rate adaptation, including predicting a future location of a user device based on one or more location parameters associated with the device, a user of the device, or a combination thereof, predicting a transmission control protocol (TCP) throughput for at least one segment of a multimedia file based on the future location of the device, and transmitting the at least one segment based on the predicted TCP throughput.

20 Claims, 11 Drawing Sheets

METHOD AND SYSTEM FOR PROVIDING DASH OPTIMIZATION FOR MOBILE DEVICES

BACKGROUND INFORMATION

The popularity of streaming videos, especially on mobile devices (e.g., cellular telephones, laptop computers, tablets, personal digital assistants, and the like) has created a challenge to service providers to, for example, provide consistently high quality video playback. Traditional approaches to streaming videos on mobile devices typically result in an inconsistent quality of experience (QoE) for the user due to the mobile device's limited hardware capabilities, and reliance on volatile wireless network conditions. Meanwhile, mobile devices are often equipped with unutilized hardware and software features that could aid in increasing a user's QoE when streaming videos. Such features include a global positioning system (GPS) receiver that enables location-based services, such as route prediction. Thus, there is a need for an approach that utilizes the built-in hardware and software features common in mobile devices to increase the QoE of streaming videos on mobile devices.

Based on the foregoing, there is a need for location-based transmission control protocol (TCP) throughput predictions and carrier-assisted video rate adaptation.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for location-based TCP throughput prediction and carrier-assisted video rate adaptation, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
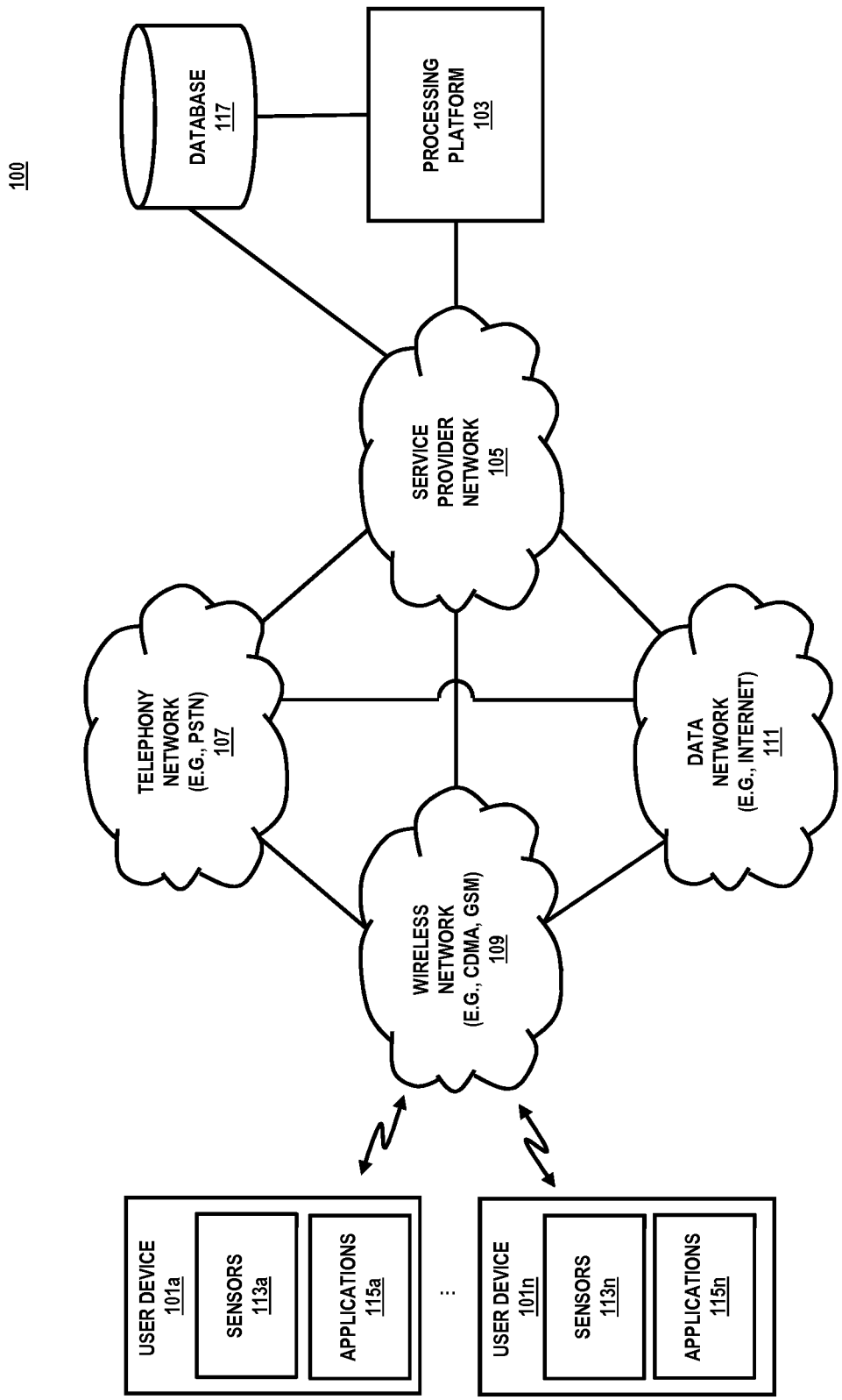
FIG. 1 is a diagram of a system capable of location-based TCP throughput predictions and carrier-assisted video rate adaptation, according to an exemplary embodiment.

FIG. 1 is a diagram of a system capable of providing location-based TCP throughput predictions and carrier-assisted video rate adaptation, according to one embodiment. Video streaming has become the dominate method of watching videos on mobile devices. Mobile device video streams are a challenge to service providers due to their limited device capabilities and the volatile wireless network conditions that these devices rely on, which can result in a lower QoE for the user. Dynamic Adaptive Streaming over HTTP (DASH) presents a partial solution to this problem. In a DASH system, a multimedia file is made available at a variety of different bit rates. The file at each rate is further partitioned into smaller segments, with each segment containing a short interval of playback time of the content. The multiple files are available at various bit rates in order to allow the DASH client to dynamically select which segments to download based on its available resources, such as bandwidth, the state of the TCP connections, display resolution, CPU, memory, and buffer size. Traditional methods of predicting TCP throughputs involve a backwards-looking approach using history data or adapting the video rate based on network metrics observed only at the sending and receiving points. Solely employing the backwards-looking approach to determine TCP throughput predictions has thus far yielded unsatisfactory results due to unreliable video streaming quality. For example, in a situation where the mobile user is traveling or the available bandwidth may fluctuate, the DASH client would have no warning of such changes and would not be able to adapt quickly enough to the changing network conditions to achieve the best QoE. For instance, the type of network a user may encounter in a single trip, or for a single video stream, may vary from a wireless fidelity ("WiFi") network to a cellular network with varying speeds, such as 4G, 3G, 2G, etc. Inaccurate predictions of the available bandwidth may result in a lower QoE. That is, service providers are still challenged to provide a QoE of similar caliber to landline services for mobile device video streams.

To address these deficiencies, system 100 of FIG. 1 introduces optimization of the DASH system involving location-based, forwarding-looking TCP throughput predictions and carrier-assisted video rate adaptation. The system 100 may include a mobile device capable of location identification and route prediction to determine a user's route. Most mobile devices have GPS capabilities, enabling location services, such as route prediction. Such predictions may be based on multiple factors including the user's travel patterns, speed, daily cyclical routines, calendar events, emails, messages, address book, recent web searches, browser bookmarks and history, etc. This route prediction may be coupled with local and upcoming network traffic updates from a network provider to further refine the TCP throughput prediction. The available local network bandwidth can be affected by multiple factors, including the number of peer mobile devices and their network usage in the same local network. A network provider will usually have a global picture of all the mobile devices it serves and the most accurate and updated information regarding ongoing network changes, such as large migrations of users to different cellular towers, or even the activities or bandwidth usage for each user. The network provider can use that information to better predict upcoming changes in network bandwidth availability to streaming mobile devices. The system 100 may use such network updates to then may predict the TCP throughput for the next segments of the video or multimedia stream for the user's predicted route, transmit the video or multimedia file according to the TCP throughput prediction, and ultimately improve the user's QoE. Therefore, the system 100 can predict the future location of a user device based on location parameters associated with the device and/or the user, predict the TCP throughput for one segment of a multimedia file based on the future location of the device, and transmit the segment based on the predicted TCP throughput.

According to one embodiment, once a location is identified, a map service may be accessed to determine network conditions including network types (e.g., Wi-Fi, 3G, 4G, 2G, etc.), bandwidth, and signal strength at that location. If we let l be the location, $s_n$ the time for downloading segment n, and $\delta$ is the location sampling interval, the user location for the $i^{th}$ interval calculated as a function of L would be:

$$l_i = L(s_n + (i-1)\delta), i=1, \ldots, m$$

Therefore, the predicted future location and TCP throughput are based on intervals of time. Additionally, the system 100 can determine the amount of time for downloading the segment and location sampling interval, wherein the predicted future location based on the intervals of time is further based on the amount of time for downloading the segment and the location sampling interval. The prediction for TCP throughput for downloading segment n can be calculated as:

$$P(n) = \frac{1}{m} \sum_{i=1}^{m} T(l_i) \mu(l_i) \sigma(l_i)$$

where T(l) is the theoretical transmission control protocol throughput at location l, $\mu(l)$ is the signal strength adjustment parameter $\epsilon[0, 1]$ at location l, and $\sigma(l)$ is the carrier feedback adjustment parameter $\epsilon(0, 1]$ at location l. Therefore, the system 100 may determine: a theoretical TCP throughput at a future location; a signal strength adjustment parameter at the future location; and determine a carrier feedback adjustment parameter at the future location wherein the predicted TCP throughput is based on the theoretical TCP throughput, the signal strength adjustment parameter, and/or the carrier feedback adjustment parameter.

Video streaming relies heavily on the local access network, which can cause a bottleneck. Upon a registration mechanism with proper security and privacy controls, network providers can provide the carrier feedback adjustment parameter based on current network conditions, such as traffic volume and collective performance benchmark from other users in the same cell covering location to the streaming mobile device. Such detailed, real-time network updates may help the system 100 calculate the video rate adaptation. In the case of a content delivery network (CDN), network providers can use this information to help choose a suitable bit rate among a variety of bit rates available in local cache.

In particular, the system 100 may use history data and sending and receiving points in addition to forward-looking, location-based TCP throughput predictions and carrier assistance. Thus, the system 100 may determine the traffic volume and collective performance benchmark from a carrier, wherein the carrier feedback adjustment parameter is based on the traffic volume and the collective performance benchmark.

According to one embodiment, P(n) may be combined with estimates based on history data. By letting Q(n) be the average throughput for downloading segment n–K through n–1. The revised throughput prediction can be formulated as:

$$\tilde{P}(n) = \alpha P(n) + \beta Q(n), \text{ where } \alpha + \beta = 1$$

More specifically, it is recommended that the weight $\alpha$ for P(n) should be bigger than $\beta$. In other words, the weight assigned to the predicted throughput be greater than weight assigned to the average throughput.

To implement the above, the system 100 may include one or more user devices 101a-101n (also collectively referred to as UDs 101) that may communicate with other elements within the system 100 to effectuate one or more functions of the processing platform 103. The UD 101 may include any customer premise equipment (CPE) capable of sending and/or receiving information over one or more of networks 105-111. For instance, the UD 101 may constitute any smart phone, or any other suitable mobile device, such as a personal digital assistant (PDA), pocket personal computer, tablet, personal computer, customized hardware, etc. In an example embodiment, a UD 101 may register or login with the processing platform 103, implicitly or explicitly, upon the start of a DASH session. In other words, a user may be aware that the UD 101 is signing on to the processing platform 103 with a front-end application indicator or the user may not be notified of the registration if the registration occurs in a background application. While streaming begins, the sensors 113a-113n (also collectively referred to as sensors 113), may begin detecting the user's location. Additionally, the sensors 113 may gather current data regarding the user's current activities, like time, date, location origin, etc. to predict the route and future locations of the user.

A UD 101 may send route predictions to the processing platform 103, where the processing platform 103 may combine the route prediction with the respective network updates to calculate the TCP throughput prediction and determine the video file bit rates to download. In another embodiment, a UD 101 may send this data to the processing platform 103 and the processing platform 103 may determine the route prediction before combining the route prediction with the respective network updates to calculate the TCP throughput prediction and determine the file bit rates to download. The UD 101 may receive real-time network information directly from the network provider or, in another embodiment, the processing platform 103 may forward the network updates to the UD 101. In another embodiment, the route prediction, network updates, and TCP throughput prediction calculations are all performed at the UD 101. The TCP throughput predictions can include the real-time network information such that the video-rate calculations reflect the latest network conditions.

The UD 101 may execute one or more applications 115a-115n (also collectively referred to as applications 115). The applications 115 may be any type of application that is executable at the UD 101. By way of example, applications 115 may include one or more media player applications, social networking applications, calendar applications, content provisioning applications, location-based service applications, navigation applications, video streaming applications, video sharing applications, and the like. In one embodiment, some of the applications 115 at a UD 101 may run as background applications, with no front-end user interface. By way of example, such applications 115 may act as a client for processing platform 103 and perform one or more functions associated with the functions of the processing platform 103 at a UD 101.

By way of example, the sensors 113 may be any type of sensor. In certain embodiments, the sensors 113 may include, for example, a camera/imaging sensor for gathering image data, an audio recorder for gathering audio data, a global positioning sensor for gathering location data, a network detection sensor for detecting wireless signals or network data, temporal information and the like. In one scenario, the sensors 113 may include location sensors (e.g., GPS), light sensors, orientation sensors augmented with a height sensor, an acceleration sensor, tilt sensors, moisture sensors, pressure sensors, audio sensors (e.g., a microphone), or receivers for different short-range communications (e.g., Bluetooth®, WiFi, near field communication (NFC), etc.).

For illustrative purposes, the networks 105-111 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 109 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 105-111 may be completely or partially contained within one another, or may embody one or more of the aforementioned infrastructures. For instance, the service provider network 105 may embody circuit-switched and/or packet-switched networks that include facilities to provide for transport of circuit-switched and/or packet-based communications. It is further contemplated that networks 105-111 may include components and facilities to provide for signaling and/or bearer communications between the various components or facilities of system 100. In this manner, networks 105-111 may embody or include portions of a signaling system 7 (SS7) network, or other suitable infrastructure to support control and signaling functions.

In one embodiment, the database 117 may store information on items of interest for specific users from the sensors 113, and/or processing platform 103, for the applications 115 or the processing platform 103 to access at a later date. In one embodiment, the database 117 may store information on items associated with different users that may help the processing platform 103 predict routes, such as cyclical routines, frequent locations, favorite routes (when multiple routes exist), calendar appointments, contacts, etc. In one embodiment, the processing platform 103 may include and/or have access to the database 117 to access and/or store information associated with different users, routes, and maps. In one embodiment, the database 117 may access and/or store images, audio, routes, locations, and other data received by sensors 105. In one embodiment, a UD 101 may access and store items in the database 117.

For example, a user may start a video stream on a UD 101 (e.g., a cellular telephone) at his home using his home's network WiFi. Upon initiation of the video stream, the system 100 may be activated and route detection may begin. In this scenario, a map or route prediction application 115 may determine by the user's speed that he is walking and based on his history, he usually walks to a nearby shopping center. As such, the system 100 may predict that the user will be traveling away from the home WiFi signal and will have to pass through a cellular 4G network area before arriving at another WiFi signal at the shopping center. The system 100 may gather data from the network provider regarding the bandwidth traffic at the cellular tower that the UD 101 will connect to on the user's commute. Thus, the system 100 may determine a TCP throughput for the different intervals of time during this trip and will adjust the cellular data speeds and plan the video stream bit rate according to the user's predicted route and the network service's information regarding current bandwidth traffic. As the user travels to a coffee shop, for example, the UD 101 will eventually be out of the user's home WiFi signal range, and the UD 101 may automatically join a cellular 4G network connection via a nearby cellular tower. Theoretically, the video stream adjustment would have predicted such a change in network type and speed such that the user's video viewing may not experience a noticeable change in quality, even as the network type changes form a home WiFi connection to a 4G cellular tower. Thus, the system 100 may determine the network type, available bandwidth, and/or signal strength, at the future location based on information from at least one map service, wherein the predicted TCP throughput is further based on the network types, available bandwidth, and/or signal strength at the future location. Additionally, one or more location parameters include a current location of the device, a travel pattern and/or speeds, daily routine, and/or calendar entries associated with the user.

In one embodiment, the processing platform 103 may determine which network tower would yield the highest bandwidth, weighing variables such as distance to the tower, local bandwidth traffic, and UD 101 power. For example, when a user is a passenger in a car and is streaming a video to a UD 101, the processing platform 103 may have predicted a favorite route of the user. The processing platform 103 may also determine that there are more than one potential cellular towers to access the service provider's network along that route. For example, the processing platform 103 may determine that while network tower A is closer, it is currently experiencing higher traffic demands compared to network tower B that is further away, but is experiencing relatively lighter user traffic. Accordingly, the processing platform 103 may determine that network tower B is the ideal cellular tower to access based on the tower's distance and current network conditions. In one embodiment, the processing platform 103 may also take into account a UD 101's current battery life, which may lead the processing platform 103 to opt for the closer cellular tower in order to save battery if the UD 101 battery is low. In the case that the UD 101's battery power is high, the processing platform 103 may opt for the further tower that is capable of transmitting at a higher bandwidth. Thus, the system 100 may determine the distance of a UD 101 from a WiFi tower, and/or a cellular tower, wherein the signal strength adjustment parameter is based on the distance.

In another embodiment, a user may be in an area that is covered by multiple towers. In such a scenario, a UD 101 or the processing platform 103 may select the cellular tower capable of the highest bandwidth available. Additionally, the processing platform 103 may switch between the towers based on one or more incoming service network updates. For example, in the case where a network update may indicate to the system 100 that a large number of users are traveling away from a nearby tower, the system 100 may switch the user's connection to the cellular tower that is freeing up, according to the one or more network updates. Thus, the system 100 can determine one or more changes in the available bandwidth from a network provider, wherein the transmission of a segment of the video or multimedia file stream is further based on the one or more changes.

Figure 2:
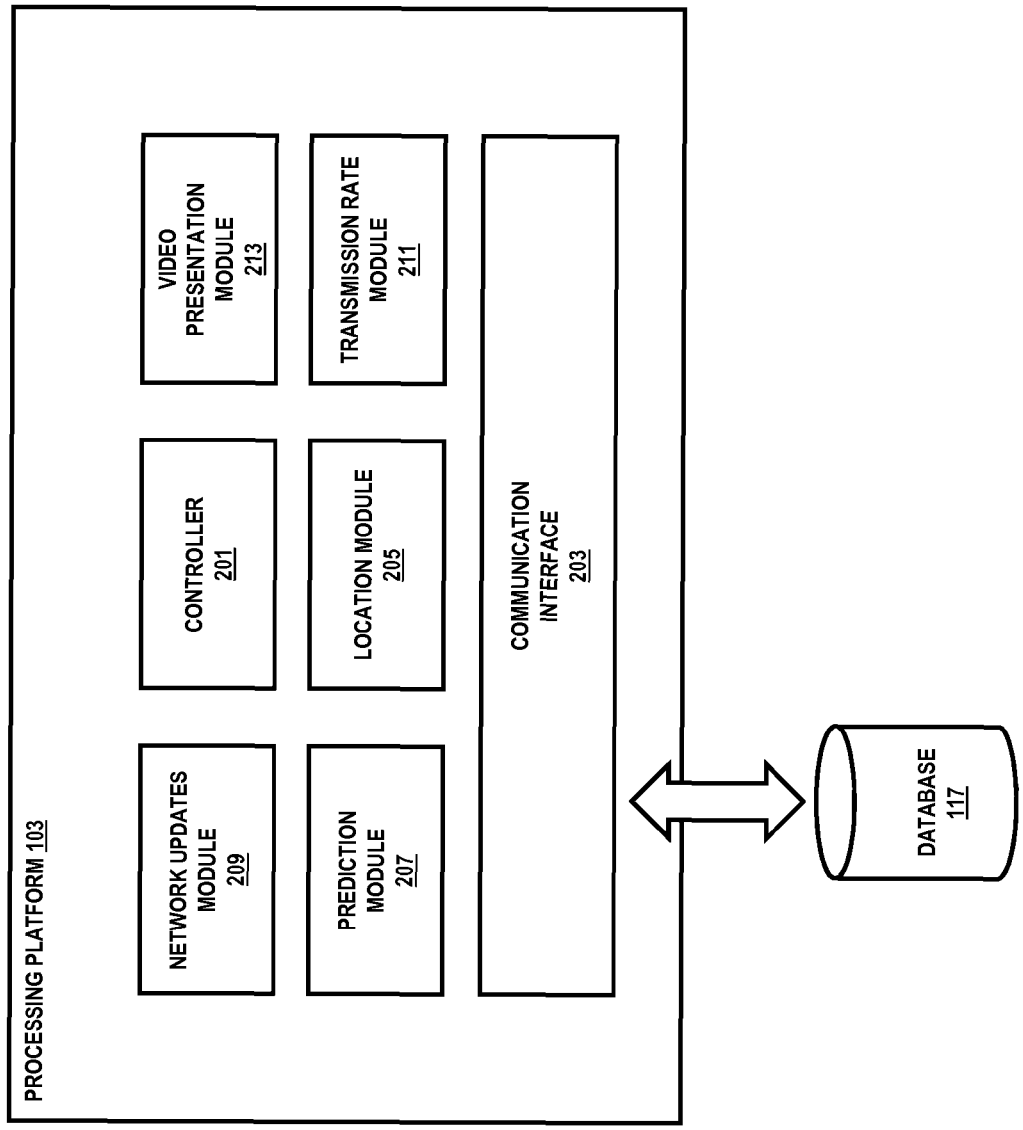
FIG. 2 is a diagram of a processing platform capable of location-based TCP throughput predictions and carrier-assisted video rate adaptation, according to an exemplary embodiment.

FIG. 2 is a diagram of a processing platform capable of location-based TCP throughput predictions and carrier-assisted video rate adaptation, according to an exemplary embodiment. Although illustrated as a separate element with respect to a service provider network 109 within the system 100, the processing platform 103 may alternatively be embodied in, for example, one or more applications 115 executed at the UDs 101 or connected to another one of the networks 105-111. In one embodiment, the processing platform 103 contains a controller 201, a communication interface 203, a location module 205, a prediction module 207, an network updates module 209, a transmission rate module 211, and a video presentation module 213. The processing platform 103 may communicate with the database 117 to retrieve a user's user profile, archived history, and the associated metadata for the user profile.

The controller 201 performs control logic functions and facilitates coordination among the other components of the processing platform 103. In one embodiment, the communication interface 203 receives sensor data from a UD 101 and the sensors 113 via networks 105-111 and provides this data throughout the processing platform 103. After the communication interface 203 receives the data from the sensors 113, the controller 201 or the communication interface 203 may transfer the data to the location module 205 to determine a user's location. Thereafter, the communication interface 203 may present the location to the prediction module 207 so that the prediction module 207 may predict a route based on the user's current location and/or the user's contextual information. As an example, contextual information may include a user profile, trip history, calendar, contacts, date, location, weather, current driving behavior, etc. In one embodiment, the prediction module 207 may access the database 117 to collect contextual information.

In one embodiment, the network updates module 209 may receive and process network updates from the communication interface 203. It is contemplated that the network updates from the service provider would first be received by the communication interface 203. In one embodiment, the network update module 209 continuously receives a stream of network updates from the communication interface 203. In another embodiment, the network updates module 209 may search for the network updates for a certain location as requested by the prediction module 207.

In one or more embodiments, the transmission rate module 211 determines a transmission rate based on the prediction module 207's predicted route for a user and the network updates module 209's latest service network update. The transmission rate module 211 can then combine the user's location information with the predictions from the prediction module 207 and analyze this data with the network update in order to calculate the TCP throughput. In one embodiment, it is contemplated that the transmission rate module 211 performs the operation of calculating the user location for the $i^{th}$ interval is denoted as:

$$l_i = L(s_n + (i-1)\delta), i=1, \ldots, m$$

The prediction for TCP throughput for downloading segment n can be calculated by the prediction module 207 as:

$$P(n) = \frac{1}{m} \sum_{i=1}^{m} T(l_i)\mu(l_i)\sigma(l_i)$$

where $s_n$ is the time for downloading segment n; $\delta$ is the location sampling interval, normally in seconds; T(l) represents the theoretical TCP throughput at location l; $\mu(l)$ is the signal strength adjustment parameter $\in [0, 1]$ at location l; and $\sigma(l)$ is the carrier feedback adjustment parameter $\in (0, 1]$ at location l.

In another embodiment, the transmission rate module may calculate the TCP throughput prediction P(n) with estimates based on history data by letting Q(n) be the average throughput for downloading segment n−K through n−1. The revised throughput prediction can be formulated as:

$$\tilde{P}(n) = \alpha P(n) + \beta Q(n), \text{ where } \alpha + \beta = 1$$

where the weight of $\alpha$ for P(n) should be bigger than $\beta$. Thus, the transmission rate module 211 can determine an average throughput for downloading one or more segments and another predicted TCP throughput based on a combination of the average throughput and the predicted throughput, wherein a weight given to the predicted TCP throughput is greater than a weight given to the average throughput.

The video presentation module 213 may render a presentation of the video playback on a UD 101 and combine the DASH system with the calculations determined by the transmission rate module 211. According to one embodiment, the video presentation module 213 may execute the DASH system of selecting which video files to download at various bit rates in order to achieve the maximum QoE playback experience. According to one embodiment, the video presentation module 213 may make such determinations based on the calculations performed by the transmission rate module 211.

Figure 3:
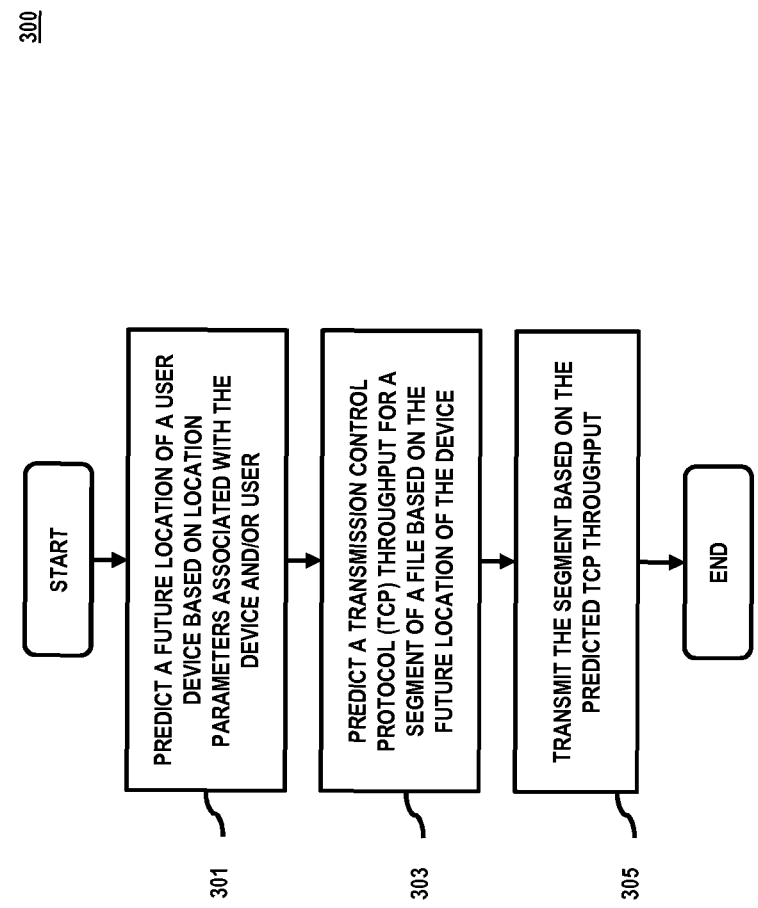
FIG. 3 is a flowchart of a process for location-based TCP throughput predictions and carrier-assisted video rate adaptation, according to an exemplary embodiment.
Figure 11:
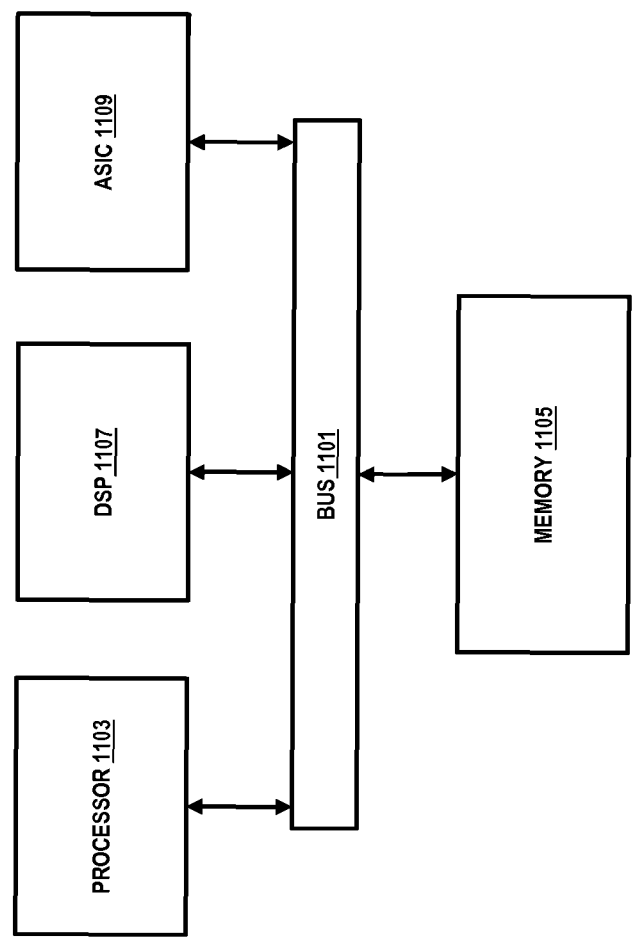
FIG. 11 is a diagram of a chip set that can be used to implement various exemplary embodiments.

FIG. 3 is a flowchart of a process for location-based TCP throughput predictions and carrier-assisted video rate adaptation, according to one embodiment. By way of example, this authentication process is explained with respect to the processing platform 103, UDs 101, and the database 117. In one embodiment, the processing platform 103 performs the process 300 and is implemented in, for instance, a chip set including a processor and a memory as shown in FIG. 11. Although FIG. 3 illustrates steps 301 through 305 in a particular order, the order and number of steps is merely for explanation, and one or more steps may be performed in a different order or removed.

In step 301, the processing platform 103 predicts a future location of a user device based on one or more location parameters associated with the device, a user of the device, or a combination thereof. By way of example, the one or more location parameters include a current location of the device, a travel pattern and/or one or more speeds associated with the user, a daily routine associated with the user, one or more calendar entries associated with user, or a combination thereof. By way of further example, the processing platform 103 may first determine a user's location using the GPS capabilities of the user device (e.g., a UD 101). The processing platform 103 may then determine whether the user is currently traveling or is stationary. If the user is stationary, the processing platform 103 may intermittently check to see if the user is still stationary. In the case where the processing platform 103 determines that the user is traveling, the processing platform may access some of the user and the UD 101's history and other data to determine a prediction of the user's possible future locations. Factors that the processing platform 103 may consider may comprise of location origin, time, day, holidays, contact's birthdays, cyclical routines, favorite routes, recent browser searches, messages, emails, calendar events, etc. Additionally, the processing platform 103 may access a number of local applications on the mobile device such as the navigation application, maps application, route prediction applications, email, messaging, calendar, social networks, web browser, etc. In one embodiment, the processing platform 103 may access the database 117 for historical information for the user and/or the UDs 101.

In step 303, the processing platform 103 predicts a TCP throughput for at least one segment of a multimedia file based on the future location of the device. As previously discussed, in a DASH system, a multimedia file is made available at a variety of different bit rates. The file at each rate is further partitioned into smaller segments, each of which contains a short interval of playback time of the content. According to one embodiment, the processing platform 103 may predict a future TCP throughput for a next or future multimedia segment based on the predicted future location of a user. Additionally, the processing platform 103 may determine the TCP throughput prediction by using the predicted route of the user and one or more real-time service network updates regarding the local network traffic. In one embodiment, a user may commute to the same workplace on a daily basis. Consequently, the processing platform 103 may learn such routines in order to yield more accurate routes, and eventually, TCP throughput predictions.

In another embodiment, a user may be moving at a constant rate on a long train ride, for example. The route prediction application 115 in a UD 101 may identify that the user is on a known train route based on the GPS's reports of the speed, time, and location. The processing platform 103 may determine that even though the user may be traveling at a constant rate for an extended period of time, the network availability for the user may fluctuate as the train traverses a number of low and high density population areas, and their respectively available bandwidths. In one embodiment, since the processing platform 103 knows the route and the an approximate amount of time it will take to download each segment, the processing platform 103 may determine a TCP throughput for all future segments based on the location and real-time network information at those locations.

In step 305, the processing platform 103 transmits the at least one segment based on the predicted TCP throughput. The DASH system not only breaks up a large multimedia file into multiple segments, but it also makes those segments available at a number of different bit rates for dynamic selection by the DASH client based on its available resources, such as bandwidth, the state of the TCP connections, display resolution, CPU, memory, and buffer size. The processing platform 103 may utilize the predicted available TCP throughput to determine which files will need to be downloaded during the course of the video stream and/or user travel. Continuing with the above train passenger example, the user device 101 may start at a high density population area (i.e., a network-rich area), but is approaching a low population and therefore service network-poor area. The service network may push the local network availability of the new location to the processing platform 103. The processing platform 103 may then select a lower bit rate media file selection in anticipation of the upcoming lower-bandwidth network. The processing platform 103 may transmit the selected file to the UD 101 and continue the streaming playback.

Figure 4:
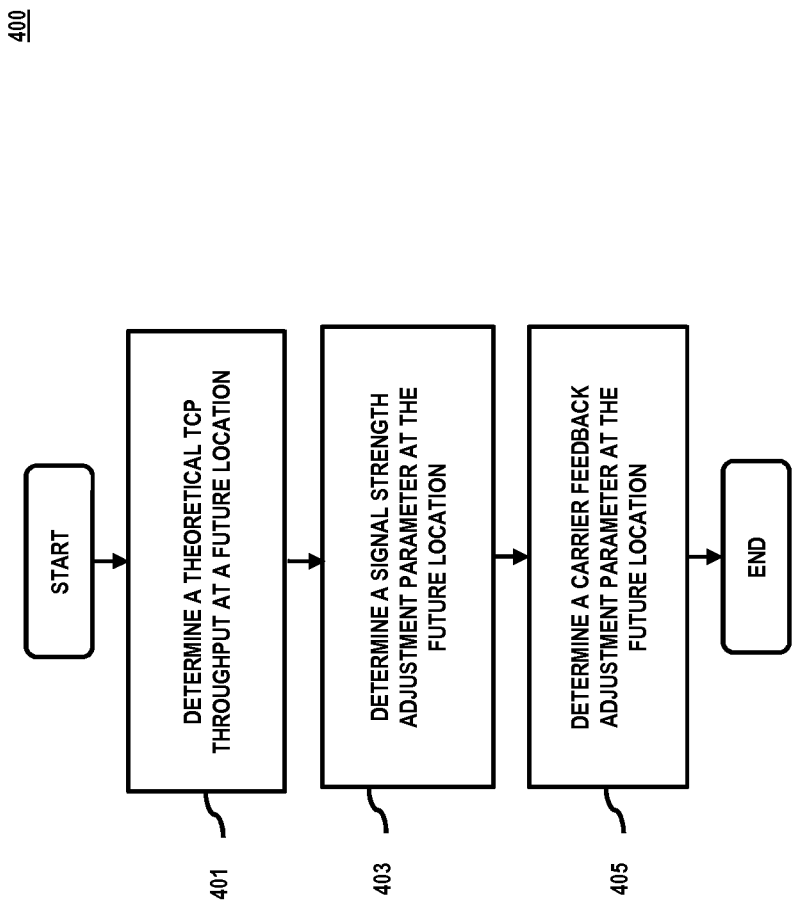
FIG. 4 is a flowchart of a process for location-based TCP throughput predictions, according to one embodiment.

FIG. 4 is a flowchart of a process for location-based TCP throughput predictions, according to one embodiment. In one embodiment, the processing platform 103 performs the process 400 and is implemented in, for instance, a chip set including a processor and a memory as shown in FIG. 11. Although FIG. 4 illustrates steps 401 through 405 in a particular order, the order and number of steps is merely for explanation, and one or more steps may be performed in a different order or removed. In step 401, the processing platform 103 determines a theoretical TCP throughput at the future location. By way of example, once the route has been predicted and the network service has pushed one or more network updates to the processing platform 103, the processing platform 103 may calculate the TCP throughput based on a number of factors. First, the processing platform must determine the user location for the $i^{th}$ interval. As previously discussed, this $i^{th}$ interval at location 1 may comprise the time for downloading a segment and the location sampling interval. Further, the TCP throughput prediction may comprise factoring the theoretical TCP throughput at a location, the signal strength adjustment parameter at location, and the carrier feedback adjustment parameter at the location.

In step 403, the processing platform 103 determines a signal strength adjustment parameter at the future location. In one example use case, in order to determine the TCP throughput prediction, the processing platform 103 first determines the signal strength adjustment parameter at the future location. The signal strength adjustment parameter is usually determined by the distance of a UD 101 from a WiFi router or cell tower. For example, the further the UD 101 is from the cell tower, the weaker the signal, and the lower the bandwidth for the user. In one embodiment, the processing platform 103 determines the user's distance from the cell tower when calculating a TCP throughput prediction because this number directly affects the available bandwidth available to the DASH client.

In step 405, the processing platform 103 determines a carrier feedback adjustment parameter at the future location, wherein the predicted TCP throughput is based on a combination of the theoretical TCP throughput, the signal strength adjustment parameter, and the carrier feedback adjustment parameter. The carrier feedback adjustment parameter may be provided by a carrier based on the current network conditions, such as traffic volume, and a collective performance benchmark from other users in the same cell covering location. As mentioned, the processing platform 103 is activated upon initiation of a multimedia file execution which would trigger an implicit or explicit registration of a UD 101 that may be associated with the processing platform 103. In one embodiment, upon such registration, the UD 101 may directly receive one or more push updates or current network conditions from the carrier. In another embodiment, the network carrier may push the real time network updates to the processing platform 103, which may then transfer these updates to the UD 101.

Figure 5:
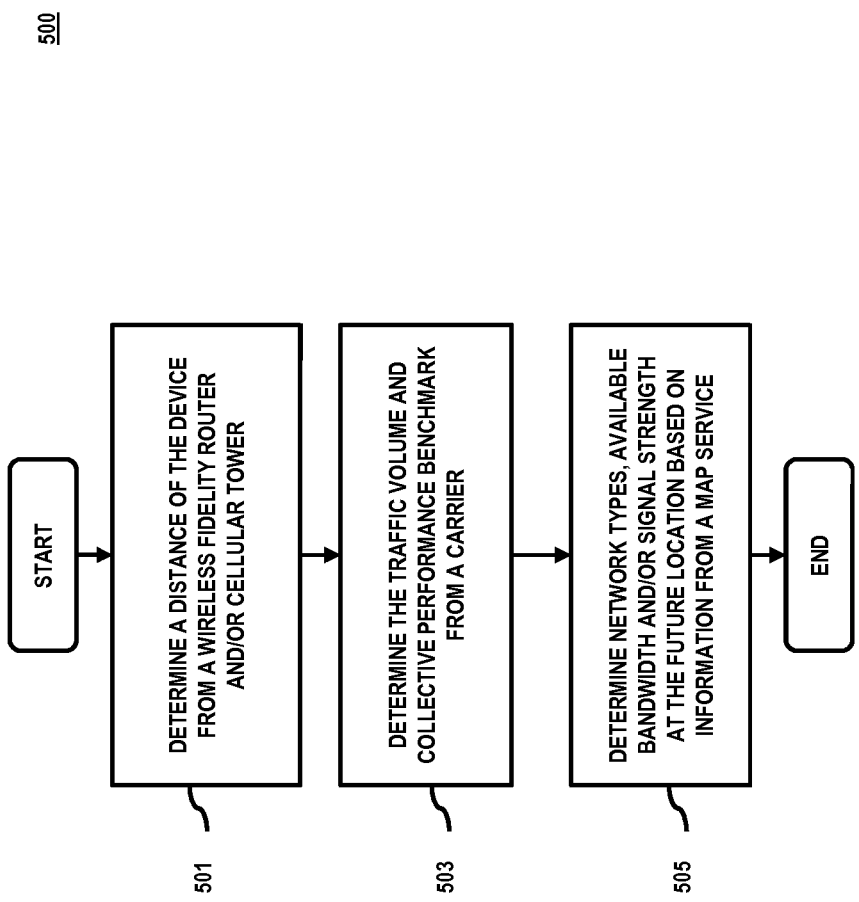
FIG. 5 is a flowchart of a process for location-based TCP throughput predictions, according to one embodiment.

FIG. 5 is a flowchart of a process for location-based TCP throughput predictions, according to one embodiment. In one embodiment, the processing platform 103 performs the process 500 and is implemented in, for instance, a chip set including a processor and a memory as shown in FIG. 11. Although FIG. 4 illustrates steps 501 through 505 in a particular order, the order and number of steps is merely for explanation, and one or more steps may be performed in a different order or removed. In step 501, the processing platform 103 determines a distance of the device from a wireless fidelity router, a cellular tower, or a combination thereof, wherein the signal strength adjustment parameter is based on the distance. In one example use case, for both WiFi routers and cellular towers, the signal strength available to a UD 101 is directly affected by the UD 101's distance from the Wi-Fi router or cellular tower. That is, WiFi routers and cellular towers generally provide network services on a fixed range and the farther the UD 101 is from a router or tower, the weaker the network signal available to the UD 101 will be. Thus, the distance of the device from the WiFi router or cell tower may be determined by the processing platform 103 in order to calculate the TCP throughput prediction. In addition, the distance of a UD 101 from a cellular tower may also require more battery power from the UD 101. According to one embodiment, the amount of battery power required and the current battery of the UD 101 may also be a factor in the signal strength adjustment parameter calculation.

In step 502, the processing platform 103 determines a traffic volume and a collective performance benchmark from at least one carrier, wherein the carrier feedback adjustment parameter is based on the traffic volume and the collective performance benchmark. In a situation where a user of a UD 101 is traveling through an area with one or more accessible cellular towers, the processing platform 103 may distinguish multiple carriers and identify which carriers' cellular towers provide the most bandwidth at a relative location. The processing platform 103 may evaluate factors such as signal strength, bandwidth availability, the number of users relying on the tower's signal, etc. For example, if a user is traveling away from a relatively busy Tower A and heading toward a Tower B with much more available bandwidth, a UD 101 or the processing platform 103 may connect to the farther, but less crowded Tower B even though the UD 101 may physically be closer to the busier Tower A. Additionally, the processing platform 103 may determine the carrier for the different towers in order to gather information from the hosted network providers in order to access data in the provider's servers about any network updates.

In step 503, the processing platform 103 determines one or more network types, an available bandwidth, a signal strength, or a combination thereof at the future location based on information from at least one map service, wherein the predicted TCP throughput is further based on the one or more network types, the available bandwidth, the signal strength, or a combination thereof at the future location. More specifically, the processing platform 103 may determine the fastest service at the next location. In the example from FIG. 1 where a user is traveling from home to a nearby shopping center, the processing platform 103 may predict that in addition to the user's 4G cellular service, there will be two different Wi-Fi routers once the user arrives at the shopping center and a wired network at the shopping center's coffee shop, for example. In one embodiment, the processing platform 103 may account for all of the various types of services, both wireless and wired, at the future location and determine the fastest connection based on updated service reports and past records of items such as the wired network service.

Figure 6:
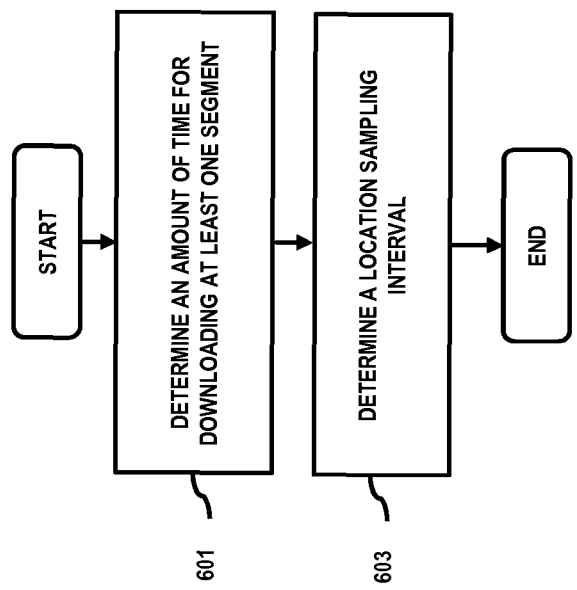
FIG. 6 is a flowchart of a process for determining a location sampling interval based on segment download time, according to one embodiment.

FIG. 6 is a flowchart of a process for determining a location sampling interval based on segment download time, according to one embodiment. In one embodiment, the processing platform 103 performs the process 600 and is implemented in, for instance, a chip set including a processor and a memory as shown in FIG. 11. Although FIG. 4 illustrates steps 601 through 603 in a particular order, the order and number of steps is merely for explanation, and one or more steps may be performed in a different order or removed. In step 601, the processing platform 103 determines an amount of time for downloading the at least one segment. As previously discussed, in a DASH system, a multimedia file is made available at a variety of different bit rates. The file at each rate is further partitioned into small segments, each of which contains a short interval of playback time of the content. More specifically, the time for downloading can be affected by available resources, such as bandwidth, the state of the TCP connections, display resolution, CPU, memory, and buffer size.

In step 602, the processing platform 103 determines a location sampling interval, wherein the predicted future location based at the one or more intervals of time is further based on the amount of time for downloading the at least one segment and the location sampling interval. In particular, once the processing platform 103 determines the amount of time to download a segment, the processing platform 103 may be able to determine the upcoming location of a user when the client will have to download the next segment in the multimedia file. By way of example, the processing platform 103 may consider the size of the segment, the current and future rates at which the segment is being downloaded, the current and predicted speed of the user, and the route on which the user is traveling. For example, if a user is streaming a live football game and each segment takes about two minutes to download, the processing platform 103 may determine where in the predicted route the user may be when the next segment needs to begin download. The processing platform 103 may then determine the available network at the future predicted location based on the speed of the user.

Figure 7:
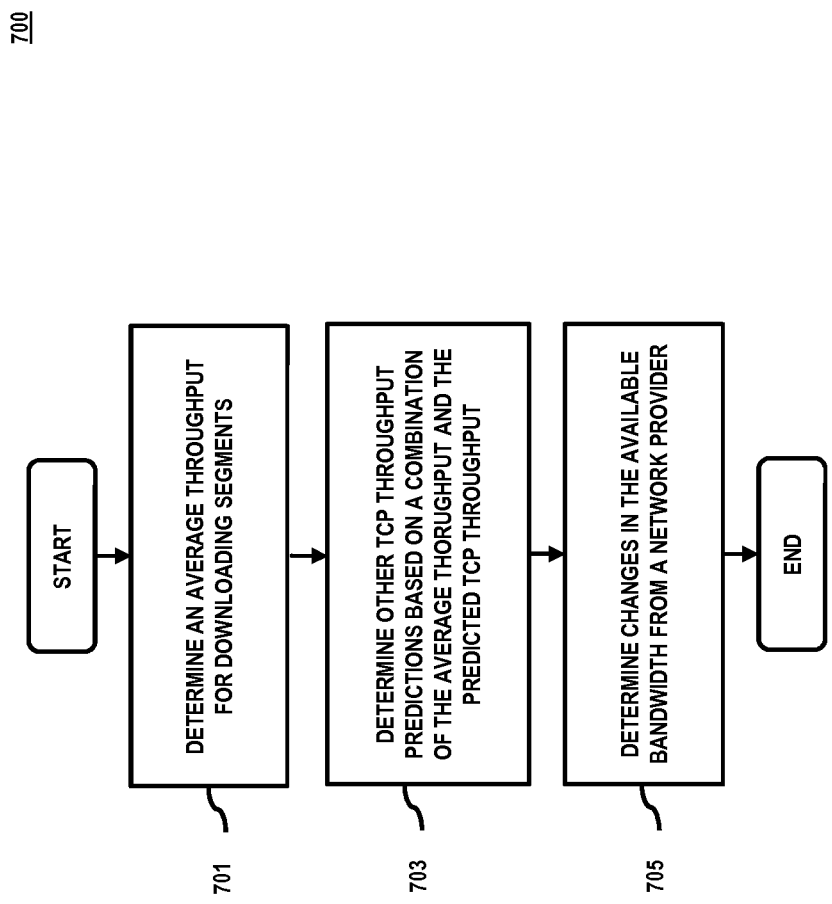
FIG. 7 is a flowchart of a process for combining forward and backward-looking TCP throughput predictions and changes in available bandwidth from a network provider, according to one embodiment.

FIG. 7 is a flowchart of a process for combing forward and backward-looking TCP throughput predictions and changes in available bandwidth from the network provider, according to one embodiment. In one embodiment, the processing platform 103 performs the process 400 and is implemented in, for instance, a chip set including a processor and a memory as shown in FIG. 11. Although FIG. 7 illustrates steps 701 through 705 in a particular order, the order and number of steps is merely for explanation, and one or more steps may be performed in a different order or removed. In step 701, the processing platform 103 determines an average throughput for downloading one or more segments. In one embodiment, the processing platform 103 may calculate the TCP throughput by utilizing both forward-looking (predicted) and backward-looking (average) data. When employing this algorithm, the processing platform 103 may first determine an average throughput for downloading segments based on history data. For example, if the first time a user streams a video while on a trip, the process platform may take the average TCP throughput for the trip based on the rate at which each segment was downloaded during the trip.

In step 703, the processing platform 103 determines at least one other predicted TCP throughput based on a combination of the average throughput and the predicted TCP throughput, wherein a weight given to the predicted TCP throughput is greater than another weight given to the average throughput. By way of example, when the processing platform 103 is determining a TCP throughput based on both forward-looking and backward-looking TCP throughputs, the processing platform 103 may predict a forward-looking TCP throughput after calculating the average backward-looking TCP throughput. More specifically, after determining both backward and forward-looking TCP throughputs, the processing platform 103 may assign a weight to each of these values, where the weight given to the forward-looking TCP value is greater than the weight assigned to the backward-looking or average TCP throughput. In one embodiment, the weight given to the backward-looking throughput may be based on the volume of data used to determine the average. For example, if the average is based on one or two prior video streams or trips, the processing platform 103 may assign the average TCP throughput a weight of 0.2 and the prediction TCP throughput a weight of 0.8. However, in the case that the average TCP throughput is based on six months of data, the processing platform may assign the average TCP throughput a weight of 0.4 while assigning the prediction TCP throughput a weight of 0.6.

In step 705, the processing platform 103 determines one or more changes in the available bandwidth from a network provider, wherein the transmission of the at least one segment is further based on the one or more changes. In one embodiment, it is contemplated that the processing platform 103 may dynamically respond to one or more service provider network updates. For example, in one example use case, a UD 101 is traveling toward an area with multiple network towers and the processing platform 103 determines to connect with Tower B due to the available bandwidth. However, as the UD 101 approaches the area, the network service provider pushes an update dramatically hindering Tower B's ability to provide consistent coverage for the next ten to fifteen minutes. Therefore, the processing platform 103 or the UD 101 may switch the next planned connection to Tower A, even though Tower A may have initially been a slower connection than Tower B.

Figure 8:
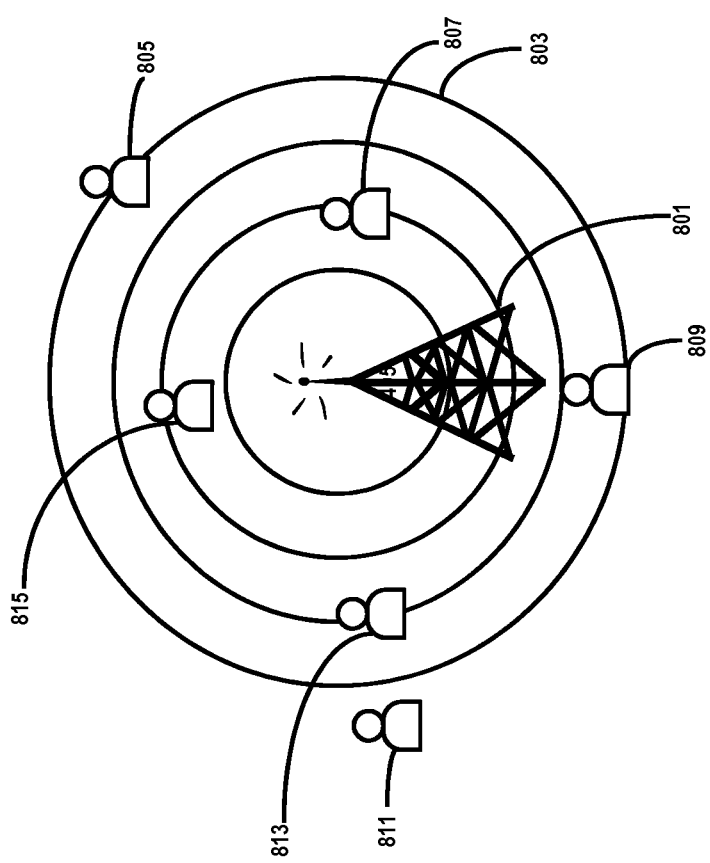
FIG. 8 is an example of the type of assistance a network provider may supply in a DASH adaptation, according to one embodiment.

FIG. 8 is an example of the type of assistance a network provider may supply in a DASH adaptation, according to one embodiment. As previously discussed, it is contemplated that a network can know the number of users serviced by a particular cellular tower and even the activities of the users therein. Additionally, a network would be aware of rapidly large fluctuations in users/trends. In this example use case, Tower 801 represents a network provider's cellular tower with the outer radius of the tower's coverage represented by the outer circle 803. User 805 represents a user that is on the outer limits of Tower 801's radius 803 coverage. Thus, the network provider may indicate that users 805, 807, 809, 811, 813, and 815 of varying distances from Tower 801 are simultaneously sharing Tower 801's bandwidth. As shown, the network provider may indicate the locations of each user 805-815 and identify that users 811 and 813 are streaming videos, for example, while users 809 and 807 are streaming a basketball game, for example. Based on such updated and detailed data, the system 100 may make a much more accurate prediction of the bandwidth available at the future location within outer radius 803 when the user of a UD 101 arrives in this area.

Figure 9:
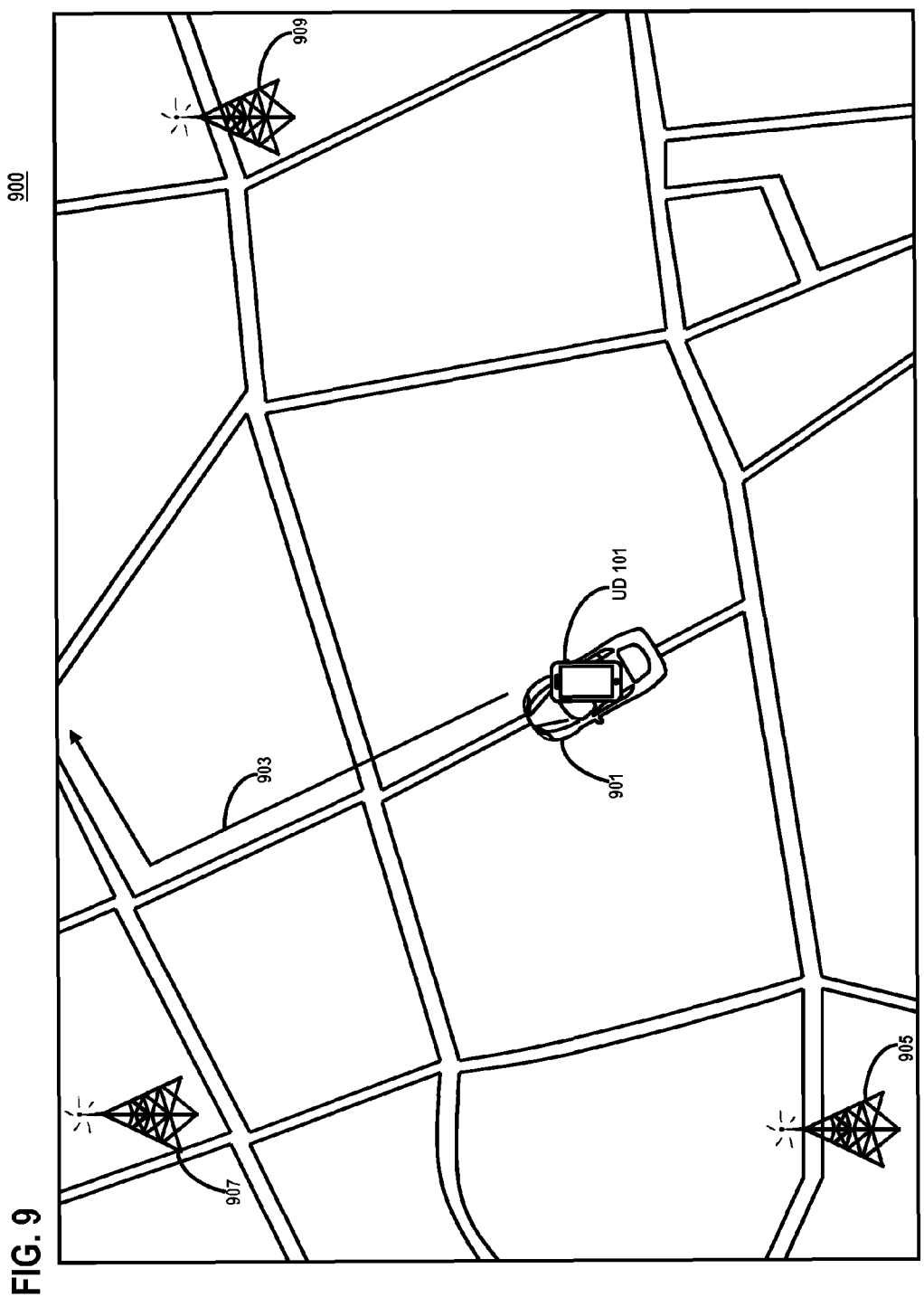
FIG. 9 is a diagram of the processing platform leveraging the signal strength of various towers within an anticipated route in order to calculate a TCP throughput, according to one embodiment.

FIG. 9 is a diagram of the system 100 leveraging the signal strength of various towers within an anticipated route in order to calculate a TCP throughput, according to one embodiment. In this example use case, a user of a UD 101 is a passenger traveling in vehicle 901 that is predicted to continue on the route indicated by the route 903. In particular, Route 903 was determined from the user's navigation application which is currently directing the user of the UD 101 to a location that is new to the user. However, the system 100 was able to predict the route of UD 101 based on the navigation route selected by the user in the navigation map application. Based on this route, the system 100 was able to identify three cellular towers 905, 907, and 909 that all service some part of the anticipated route 903. In one embodiment, as the UD 101 continues on route 903, the processing platform 103 is being updated by a network service provider regarding the current bandwidth traffic associated with of each of the towers 905-909. While the UD 101 is approaching this route, the UD 101 is connected to cellular tower 905. As planned by system 100, the UD 101 would switch to tower 907 as the UD 101 is approaching the area covered by the tower 907 and moving away from tower 905. However, the UD 101 receives a network update from the network provider indicating a meaningful increase in the number of users connected to tower 907. Due to this update, the system 100 via an application 115 may direct the UD 101 to stay connected to tower 905, even though it is farther away than tower 907. Additionally, based on the route prediction and the segment size, the system 100 will plan for the DASH client to stay connected to tower 905 until the UD 101 gets close enough to connect with tower 909, pending any network status updates to tower 909 in the interim.

Figure 10:
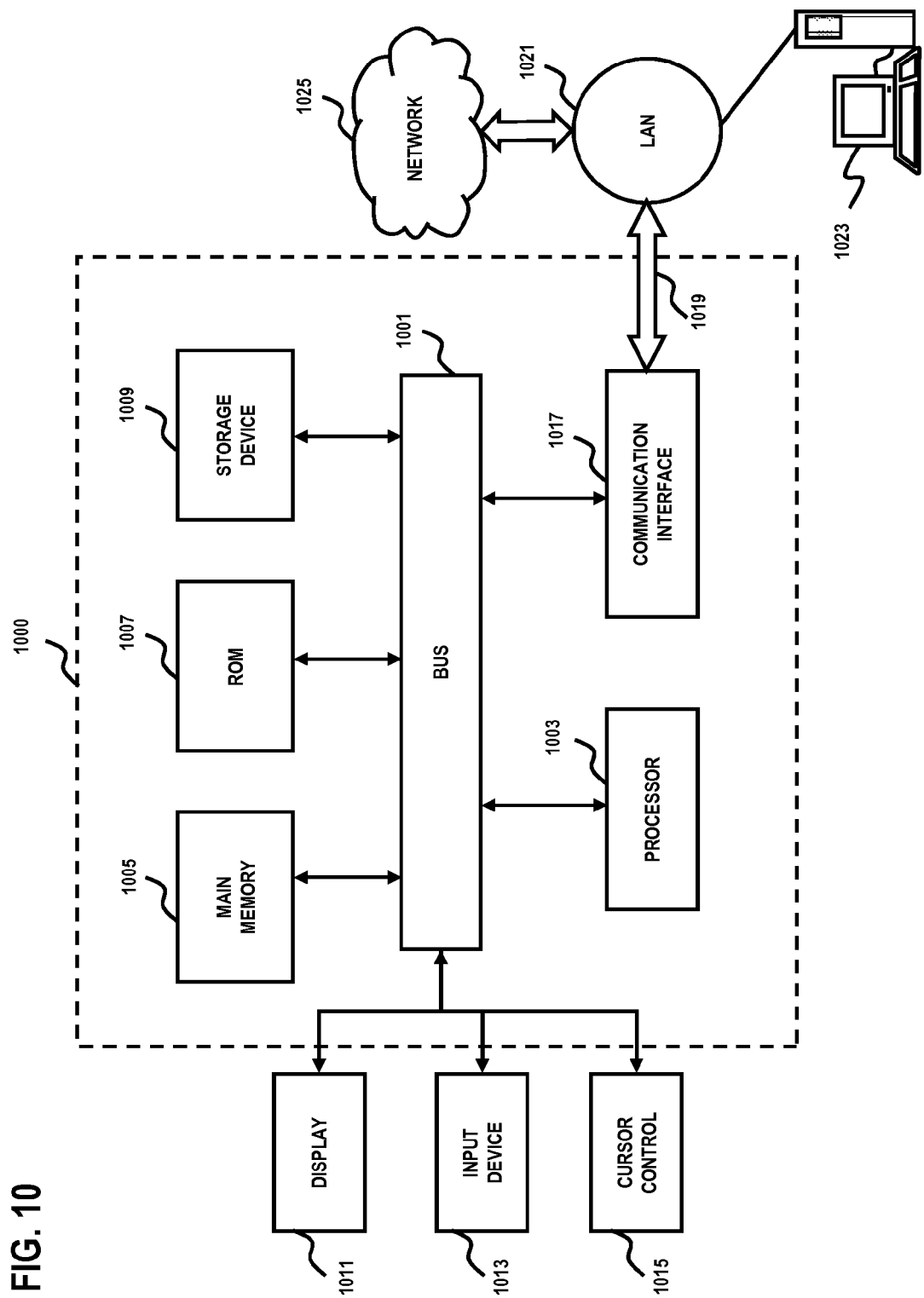
FIG. 10 is a diagram of a computer system that can be used to implement various exemplary embodiments.

FIG. 10 illustrates computing hardware (e.g., computer system) upon which an embodiment according to the invention can be implemented. The computer system 1000 includes a bus 1001 or other communication mechanism for communicating information and a processor 1003 coupled to the bus 1001 for processing information. The computer system 1000 also includes main memory 1005, such as random access memory (RAM) or other dynamic storage device, coupled to the bus 1001 for storing information and instructions to be executed by the processor 1003. Main memory 1005 also can be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

An apparatus, method, and software for processing log information across multiple services running multiple processes, such as across a system used by a telecommunications service provider, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to processing log information for a telecommunications service provider, it is contemplated that these embodiments have applicability to systems operated by different organizations and to other operations wherein log information is collected.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 11 illustrates a chip set 1100 upon which an embodiment of the invention may be implemented. Chip set 1100 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of FIGS. 3-7.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1103, or one or more application-specific integrated circuits (ASIC) 1109. A DSP 1103 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   predicting a future location of a user device based on a plurality of location parameters associated with the device or a user of the device,
   wherein the plurality of location parameters include a current location of the device, a daily routine associated with the user, and one or more calendar entries associated with the user;
   determining a signal strength adjustment parameter at the future location based on a determination of a distance that the device will be from a cellular tower, a current battery life of the user device, and an amount of battery power required by the user device at the future location;
   predicting a transmission control protocol (TCP) throughput for downloading at least one segment of a multimedia file at the future location of the device,
   wherein the predicted TCP throughput is based on the signal strength adjustment parameter,
   and wherein the at least one segment is available to be downloaded at a plurality of bit rates; and
   transmitting the at least one segment at a particular bit rate, of the plurality of bit rates, based on the predicted TCP throughput.

2. A method of claim 1, further comprising:
   determining a theoretical TCP throughput at the future location; and
   determining a carrier feedback adjustment parameter at the future location,
   wherein the predicted TCP throughput is further based on a combination of the theoretical TCP throughput, and the carrier feedback adjustment parameter.

3. A method of claim 2, further comprising:
   determining a traffic volume and a collective performance benchmark from at least one carrier,
   wherein the carrier feedback adjustment parameter is based on the traffic volume and the collective performance benchmark.

4. A method of claim 1, further comprising:
   determining one or more network types, an available bandwidth, or a signal strength at the future location based on information from at least one map service,
   wherein the predicted TCP throughput is further based on the one or more network types, the available bandwidth, or the signal strength at the future location.

5. A method of claim 1, wherein the predicted future location and TCP throughput are based on one or more intervals of time.

6. A method of claim 5, further comprising:
   determining an amount of time for downloading the at least one segment; and
   determining a location sampling interval,
   wherein the predicted future location is based on the one or more intervals of time is further based on the amount of time for downloading the at least one segment and the location sampling interval.

7. A method of claim 1, wherein the plurality of location parameters further include a travel pattern or one or more speeds associated with the user.

8. A method of claim 1, further comprising:
   determining an average throughput for downloading one or more segments; and
   determining at least one other predicted TCP throughput based on a combination of the average throughput and the predicted TCP throughput,
   wherein a weight given to the predicted TCP throughput is greater than another weight given to the average throughput.

9. A method of claim 1, further comprising:
   determining one or more changes in the available bandwidth from a network provider, wherein the transmission of the at least one segment is further based on the one or more changes.

10. An apparatus comprising a processor configured to:
    predict a future location of a user device based on a plurality of location parameters associated with the device or a user of the device,
    wherein the plurality of location parameters include at least one of a current location of the device, a daily routine associated with the user, or one or more calendar entries associated with the user;
    determine a signal strength adjustment parameter at the future location based on a determination of a distance that the device will be from a cellular tower, a current battery life of the user device, and an amount of battery power required by the user device at the future location;

predict a transmission control protocol (TCP) throughput for downloading at least one segment of a multimedia file at the future location of the device,
wherein the predicted TCP throughput is based on the signal strength adjustment parameter,
and wherein the at least one segment is available to be downloaded at a plurality of bit rates; and
transmit the at least one segment at a particular bit rate, of the plurality of bit rates, based on the predicted TCP throughput.

11. An apparatus of claim 10, wherein the apparatus is further configured to:
determine a theoretical TCP throughput at the future location; and
determine a carrier feedback adjustment parameter at the future location,
wherein the predicted TCP throughput is further based on a combination of the theoretical TCP throughput, and the carrier feedback adjustment parameter.

12. An apparatus of claim 11, wherein the apparatus is further configured to:
determine a traffic volume and a collective performance benchmark from at least one carrier,
wherein the carrier feedback adjustment parameter is based on the traffic volume and the collective performance benchmark.

13. An apparatus of claim 10, wherein the apparatus is further configured to:
determine one or more network types, an available bandwidth, or a signal strength at the future location based on information from at least one map service,
wherein the predicted TCP throughput is further based on the one or more network types, the available bandwidth, or the signal strength at the future location.

14. An apparatus of claim 10, wherein the predicted future location and TCP throughput are based on one or more intervals of time.

15. An apparatus of claim 14, wherein the apparatus is further configured to:
determine an amount of time for downloading the at least one segment; and
determine a location sampling interval,
wherein the predicted future location is based on the one or more intervals of time is further based on the amount of time for downloading the at least one segment and the location sampling interval.

16. An apparatus of claim 15, wherein the plurality of location parameters further include a travel pattern or one or more speeds associated with the user.

17. An apparatus of claim 10, wherein the apparatus is further configured to:
determine an average throughput for downloading one or more segments; and
determine at least one other predicted TCP throughput based on a combination of the average throughput and the predicted TCP throughput,
wherein a weight given to the predicted TCP throughput is greater than another weight given to the average throughput.

18. An apparatus of claim 17, wherein the apparatus is further configured to:
determine one or more changes in the available bandwidth from a network provider, wherein the transmission of the at least one segment is further based on the one or more changes.

19. A non-transitory computer-readable medium containing instructions, the instructions comprising:
one or more instructions that, when executed by a processor, cause the processor to:
predict a future location of a user device based on a plurality of location parameters associated with the device or a user of the device;
determine a signal strength adjustment parameter at the future location based on a determination of a distance that the device will be from a cellular tower, a current battery life of the user device, and an amount of battery power required by the user device at the future location;
predict a transmission control protocol (TCP) throughput for downloading at least one segment of a multimedia file at the future location of the device,
wherein the predicted TCP throughput is based on the signal strength adjustment parameter,
and wherein the at least one segment is available to be downloaded at a plurality of bit rates; and
transmit the at least one segment at a particular bit rate, of the plurality of bit rates, based on the predicted TCP throughput.

20. The non-transitory computer-readable medium of claim 18, wherein the instructions further include one or more instructions that, when executed by the processor, cause the processor to:
determine a theoretical TCP throughput at the future location; and
determine a carrier feedback adjustment parameter at the future location,
wherein the predicted TCP throughput is further based on the theoretical TCP throughput and the carrier feedback adjustment parameter.

* * * * *